No. 618,147. Patented Jan. 24, 1899.
E. TYDEN.
SELF LOCKING SEAL.
(Application filed Apr. 4, 1898.)
(No Model.)
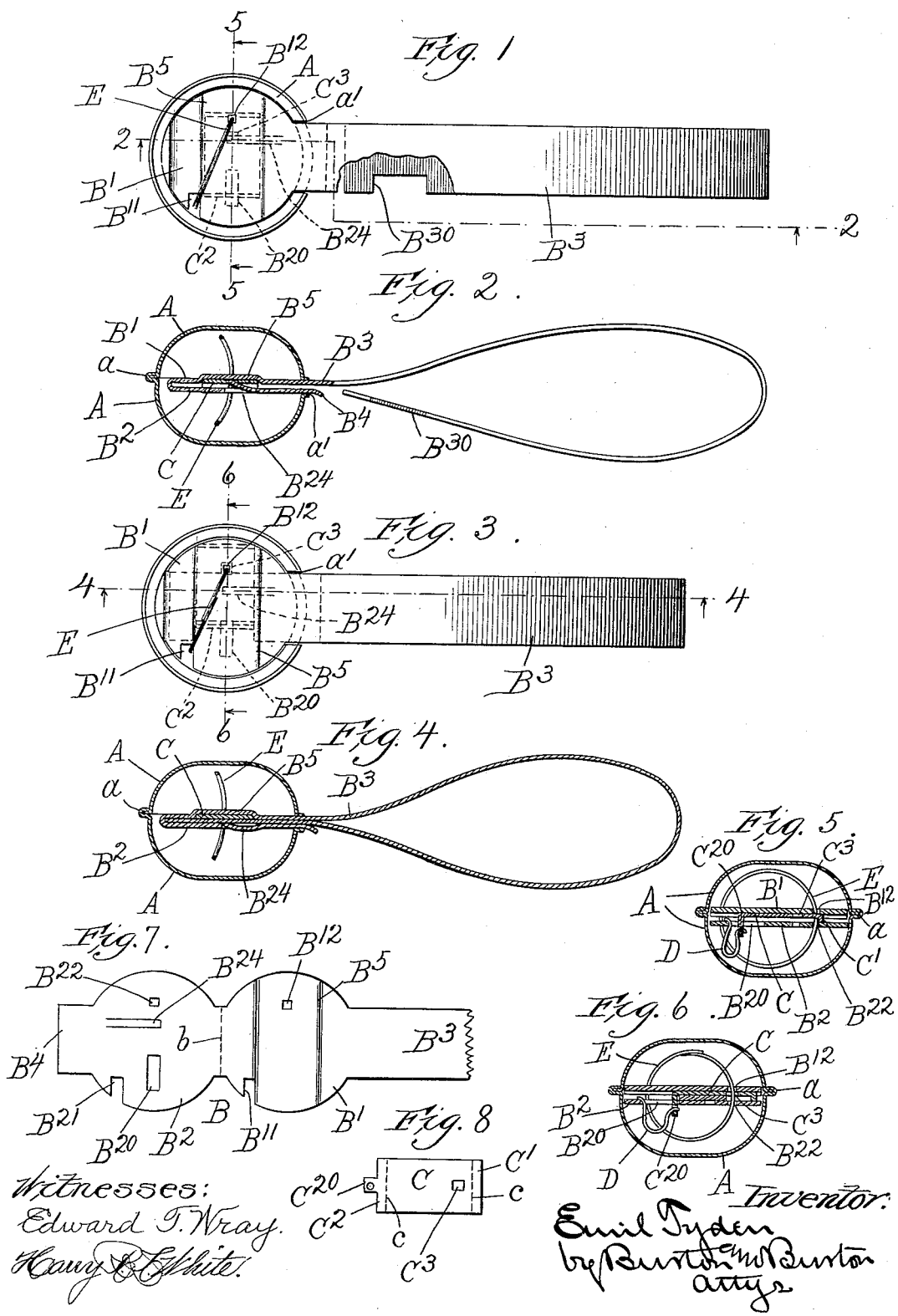

UNITED STATES PATENT OFFICE.

EMIL TYDEN, OF CHICAGO, ILLINOIS, ASSIGNOR TO THE INTERNATIONAL SEAL AND LOCK COMPANY, OF HASTINGS, MICHIGAN.

SELF-LOCKING SEAL.

SPECIFICATION forming part of Letters Patent No. 618,147, dated January 24, 1899.

Application filed April 4, 1898. Serial No. 676,439. (No model.)

*To all whom it may concern:*

Be it known that I, EMIL TYDEN, a citizen of the United States, residing at Chicago, county of Cook, and State of Illinois, have invented certain new and useful Improvements in Self-Locking Seals, which are fully set forth in the following specification, reference being had to the accompanying drawings, forming a part thereof.

In the drawings, Figure 1 is a plan of my improved seal-lock or self-locking seal with one cap removed from the body or case. Fig. 2 is a section of the device with the cap in place at the plane indicated by the line 2 2 on Fig. 1. Fig. 3 is a plan similar to Fig. 1, except that whereas Fig. 1 shows the device before locking Fig. 3 shows the position of the parts after locking. Fig. 4 is a section of the entire device at the line 4 4 on Fig. 3. Fig. 5 is section at the line 5 5 on Fig. 1. Fig. 6 is section at the line 6 6 on Fig. 3. Fig. 7 is a plan of the blank, which is folded to form the sheath for the securing device and keeper. Fig. 8 is a plan of the blank, which is folded to form the keeper.

The case or body A is formed of two parts, seamed together at $a$ and having a throat at $a'$. Within the case there is lodged the sheath B, formed of one piece by folding at the line $b$, (see Fig. 7,) the two leaves $B'$ and $B^2$ being adapted to lodge and fit snugly within the case, while the portions $B^3$ and $B^4$ extend through the throat, the part $B^3$ being produced to constitute the securing device, which is a flexible metal strap whose end remote from the sheath is adapted to be inserted back into the sheath, forming a loop by which the seal is connected to the lock or other fastening which is to be protected by the seal. The parts $B^3$ and $B^4$, which when the sheath B is folded into complete form extend out through the throat $a'$ of the case, constitute what may be termed the "throat" for the securing device or strap $B^3$, forming, as they do, a guide-way or path for the end of the strap into the seal-body, where it is locked by the devices hereinafter described. In the member $B'$ of the sheath there is formed a transverse seat or plate (shown at $B^5$) for the keeper C. This keeper is formed of a piece of sheet metal folded up at the lines $c$ $c$, (see Fig. 8,) so that when lodged in the seat $B^5$ the lips $C'$ $C^2$ extend across the interval between the two leaves $B'$ and $B^2$ of the sheath, the ends of the lips bearing against the leaf $B^2$. The depth of the seat $B^5$ being equal to the thickness of the sheet metal of which the keeper C is formed, the keeper thus formed does not obstruct the throat or entrance-way for the securing device $B^3$ unless it is thrust longitudinally in said seat to such position as to bring one of the lips into the path of the securing device. The lip $C^2$ has a tooth $C^{20}$, which protrudes through a slot $B^{20}$ of the sheath, thus partly guiding the keeper in its movement in the seat $B^5$; but the primary purpose of this tooth is to afford a point or abutment for the reaction of the spring D, which at one end is hooked into said tooth and at the other end is engaged with the sheath by being hooked into the slot $B^{20}$ and tends to thrust the keeper inward to such position that its lip $C^2$ may stand in the throat or path of entrance of the securing device $B^3$. Said securing device has a notch $B^{30}$, a little way back from the end, wide enough to receive the lip $C^2$ when the latter is thus thrust into its seat in a direction transverse to the throat and entering movement of the securing device.

E is a spring-catch, which is a piece of spring-wire coiled until its ends lap slightly, forming a spring which is adapted to be spread open, as seen in Fig. 5. This catch has the side opposite the latched or spread ends lodged in the coinciding notches $B^{11}$ $B^{21}$ in the leaves $B'$ and $B^2$, respectively, of the sheath, and its spread ends are entered through apertures $B^{12}$ and $B^{22}$, and between them the keeper C is grasped at a point close to the lip $C'$ when the keeper is at the position shown in Fig. 5—that is, withdrawn so that the lip $C^2$ does not stand in the path of the securing device. The keeper has an aperture $C^3$ at a position which registers with the apertures $B^{12}$ and $B^{22}$ when the keeper is thrust in to the limit allowed by the length of the slot $B^{20}$. The leaf $B^2$ has struck from its substance a spring finger or tooth $B^{24}$, which while remaining attached to the leaf at the root, as most clearly seen in Figs. 2 and 7, nevertheless at the free end normally projects toward the opposite leaf B' of the sheath, and thus stands normally across the throat or path of the securing device, and it is located at such position that the free end enters the aperture C³ in the keeper while the latter is at unlocked position, (shown in Fig. 5,) and thus entering serves as a detent to hold the keeper at such unlocked position against the tension of the spring D. This detent B²⁴ presents a long sloping face to the entrance of the throat and in the path of the entering end of the securing device, so that when the latter is intruded after the end has entered between the lips C' and C² of the keeper, but before the notch B³⁰ stands in line with the lip C², said securing device forces back the detent B²⁴, disengaging it from the notch C³ of the keeper and leaving the latter subject to the stress of the spring D. At this stage, however, of the inward movement of the securing device the intruded end of the latter, below the notch B³⁰, is itself in position to stop the lip C², so that notwithstanding the withdrawal of the detent the keeper cannot move in to locked position until the notch B³⁰ stands in the path of the lip C², whereupon the reaction of the spring D forces the keeper to the position shown in Fig. 6, where the lip C² engages the notch B³⁰ and prevents the withdrawal of the securing device. The same movement of the keeper which effects this engagement brings its aperture C³ to the point where the spread ends of the catch E are held in the apertures B¹² and B²², whereupon the spring closes, lapping its ends through the aperture C³, and by its reaction in thus closing usually it flies around some little distance to a position, for example, such as shown in Fig. 6, and thus extends through both leaves of the sheath and the keeper, locking the latter to the sheath and preventing any movement by which such keeper might be disengaged from the notch of the securing device. It will be observed that the locking is effectual even without regard to the fact that the catch E is held in the apertures B¹² and B²² of the sheath, because even if it could move so far as the sheath is concerned it extends past the edge of the securing device opposite the notch, and any withdrawing movement of the keeper would be prevented by the stoppage of the catch against that edge of the securing device.

I do not limit myself to the character of the spring which actuates the keeper nor of the detent which detains it; nor do I desire to be limited, specifically, to a construction in which the catch E is stopped with respect to the sheath, although I desire to claim this construction as having certain specific advantages.

I claim—

1. In a self-locking seal, in combination with the case, a securing device adapted to be advanced within the case; an automatically-actuated keeper adapted to engage the securing device, and a detent to hold it out of engagement; such detent being exposed in the path of the securing device and adapted to be disengaged thereby from the keeper.

2. In a self-locking seal, in combination with the case, a securing device adapted to be advanced within the case; a keeper adapted to engage and retain the securing device, and a catch which is, by construction, held under tension to react into engagement with the keeper when the latter moves into engagement with the securing device; a spring adapted to throw the keeper into engagement with the securing device; a detent to detain the keeper against the action of such spring, such detent being in the path of the advancing movement of the securing device and adapted to be thereby disengaged from the keeper.

3. In a self-locking seal, in combination with the case, a securing device adapted to be advanced longitudinally in and when locked to be laterally stopped with respect to such case, and having a notch in one edge; a keeper lodged and adapted to be moved within the case transversely to the longitudinal extent and movement of the securing device, such keeper having an abutment adapted to engage the notch in the securing device; and a catch which is by construction held under tension ready to react across the plane of the securing device beyond the notch and into engagement with the keeper, and to be tripped to permit such reaction by the movement of the keeper into engagement with the notch.

4. In a self-locking seal, in combination with the case, a sheath or guide for the securing device lodged and retained permanently within the case, the securing device adapted to be inserted into and laterally confined to such sheath; a keeper seated and adapted to be moved in the sheath transversely to the movement therein of the securing device, the latter having a notch and the keeper having a shoulder or abutment adapted to engage the notch; a spring tending to throw the keeper into such engagement, and a detent attached to the sheath and extended into the path of the securing device and adapted to engage the keeper at unlocked position, and to be disengaged therefrom by the insertion of the securing device; and a spring-catch which is engaged by the sheath and is adapted to engage the keeper when the latter is at locked position and tripped into such engagement by the movement of the keeper to such position.

5. In a self-locking seal, in combination with the case, the securing device adapted to be advanced within the case; a keeper adapted to engage and retain the securing device; a catch in the form of an elastic ring coiled with its ends normally adapted to lap, such catch being by construction spread and having its ends lodged against opposite surfaces of the keeper; suitable device for retaining such catch against movement with the keeper, the keeper having an aperture through which the ends of the catch may pass; a spring to actuate the keeper to cause it to engage the securing device and bring said aperture to the ends of the spread catch, whereby the keeper is locked by the catch when it moves into engagement with the securing device.

In testimony whereof I have hereunto set my hand, in the presence of two witnesses, at Chicago, Illinois, this 26th day of March, 1898.

EMIL TYDEN.

Witnesses:
   CHAS. S. BURTON,
   JEAN ELLIOTT.